(12) United States Patent
Fuller

(10) Patent No.: US 11,376,904 B2
(45) Date of Patent: Jul. 5, 2022

(54) RECEIVER ADAPTER

(71) Applicant: N-FAB, INC., Ann Arbor, MI (US)

(72) Inventor: Justin Daniel Fuller, Tomball, TX (US)

(73) Assignee: N-FAB, INC., Ann Arbor, MI (US)

( * ) Notice: Subject to any disclaimer, the term of this patent is extended or adjusted under 35 U.S.C. 154(b) by 0 days.

(21) Appl. No.: 16/587,776

(22) Filed: Sep. 30, 2019

(65) Prior Publication Data

US 2020/0130440 A1 Apr. 30, 2020

Related U.S. Application Data

(60) Provisional application No. 62/751,345, filed on Oct. 26, 2018.

(51) Int. Cl.
*B60D 1/24* (2006.01)
*B60R 9/06* (2006.01)

(52) U.S. Cl.
CPC . *B60D 1/24* (2013.01); *B60R 9/06* (2013.01)

(58) Field of Classification Search
CPC ..................................... B60D 1/24; B60R 9/06
USPC ......................................................... 280/163
See application file for complete search history.

(56) References Cited

U.S. PATENT DOCUMENTS

| 5,333,888 | A | * | 8/1994 | Ball | B60D 1/52 |
| | | | | | 280/504 |
| 5,423,566 | A | * | 6/1995 | Warrington | B60D 1/52 |
| | | | | | 224/521 |
| 6,105,989 | A | * | 8/2000 | Linger | B60D 1/241 |
| | | | | | 280/506 |
| 6,170,843 | B1 | | 1/2001 | Maxwell et al. | |
| 6,769,704 | B2 | | 8/2004 | Cipolla | |
| 6,835,021 | B1 | * | 12/2004 | McMillan | B60D 1/155 |
| | | | | | 280/504 |
| 7,093,845 | B1 | * | 8/2006 | Fast | B60D 1/50 |
| | | | | | 280/489 |
| 8,251,387 | B2 | | 8/2012 | Gansberger | |
| 8,727,364 | B2 | | 5/2014 | Masanek, Jr. et al. | |
| 9,085,264 | B2 | | 7/2015 | Anderson | |
| 10,202,011 | B2 | | 2/2019 | MacNeil et al. | |
| 2004/0160035 | A1 | * | 8/2004 | Stodola | B60R 3/00 |
| | | | | | 280/163 |
| 2006/0208456 | A1 | * | 9/2006 | Weaver | B60D 1/06 |
| | | | | | 280/491.5 |
| 2007/0001473 | A1 | * | 1/2007 | Eidsmore | B60P 1/24 |
| | | | | | 296/26.08 |
| 2009/0014983 | A1 | * | 1/2009 | McKendry | B60D 1/241 |
| | | | | | 280/506 |
| 2009/0079157 | A1 | * | 3/2009 | Fratzke | B60R 3/02 |
| | | | | | 280/166 |
| 2010/0201102 | A1 | * | 8/2010 | Weaver | B60D 1/025 |
| | | | | | 280/506 |

(Continued)

*Primary Examiner* — Bryan A Evans
(74) *Attorney, Agent, or Firm* — The Dobrusin Law Firm, P.C.; Bryan S. Lemanski

(57) ABSTRACT

A receiver adapter comprising: a hitch post including: (i) a stable post and (ii) a bias post that is movable relative to the stable post between a removable position and a locked position. The receiver adapter may include a bias member that extends from the stable post to the bias post and, upon movement of an adjuster, the bias post moves relative to the stable post to increase a height or a cross-sectional thickness of the hitch post.

19 Claims, 3 Drawing Sheets

(56) References Cited

U.S. PATENT DOCUMENTS

| | | | |
|---|---|---|---|
| 2010/0283225 A1* | 11/2010 | Lahn | B60D 1/06 280/506 |
| 2012/0228852 A1* | 9/2012 | Bessette | B60D 1/06 280/507 |
| 2014/0084568 A1* | 3/2014 | Lahn | B60D 1/241 280/506 |
| 2015/0343866 A1* | 12/2015 | Williams | B60D 1/52 29/525.04 |

* cited by examiner

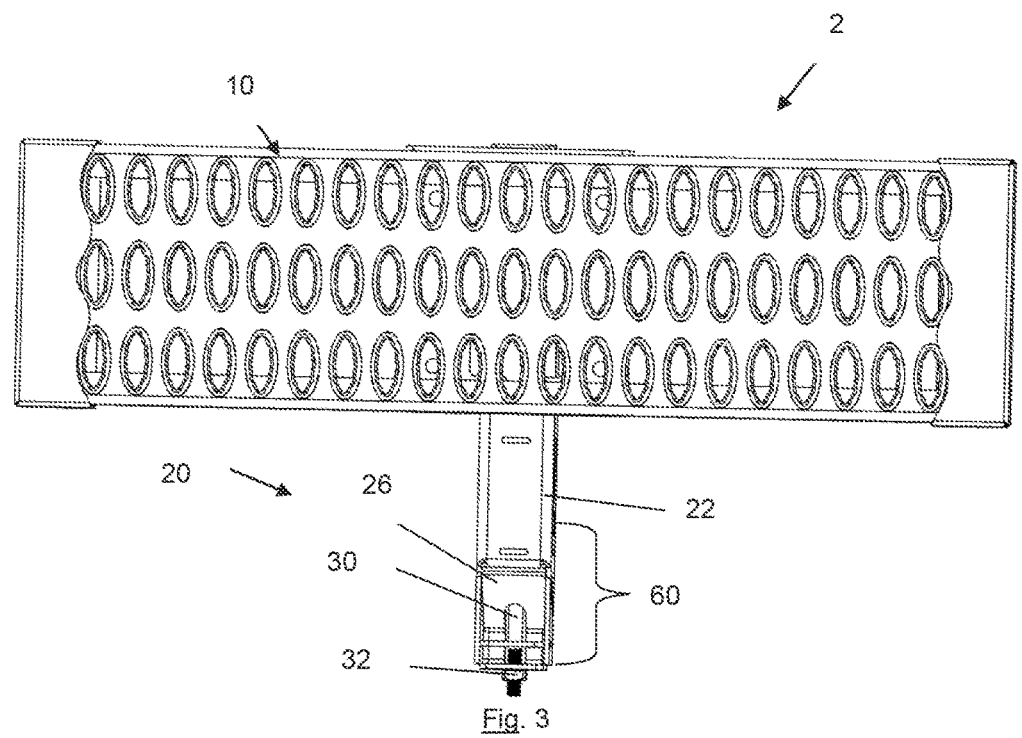
Fig. 3
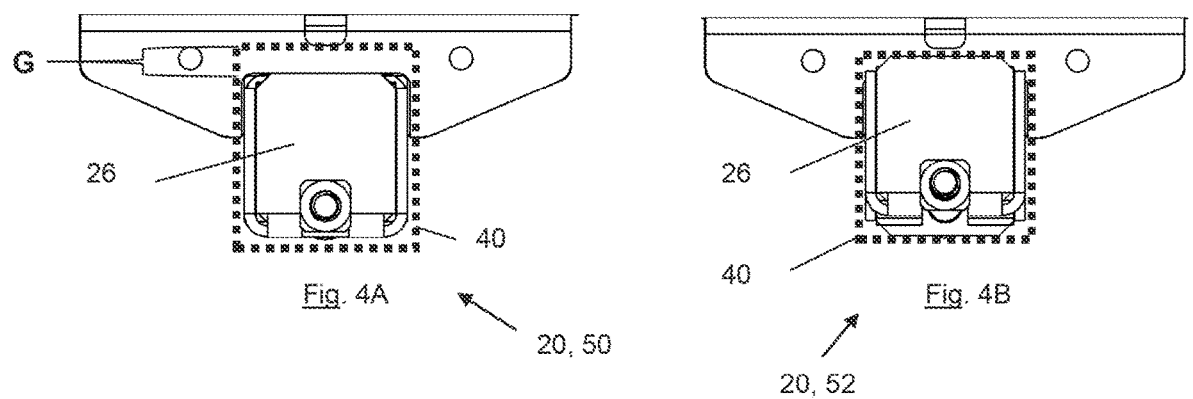
Fig. 4A
Fig. 4B

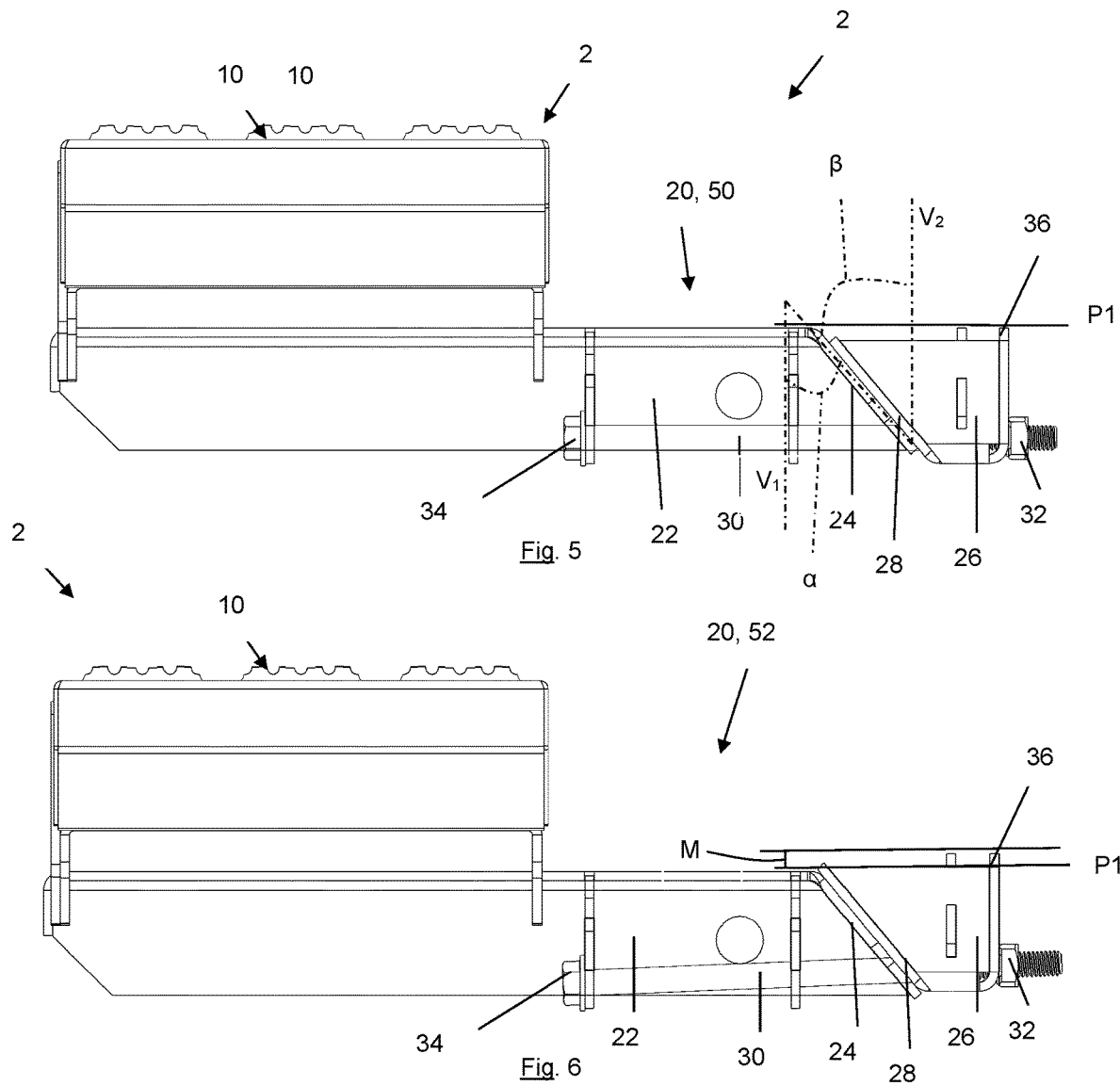

RECEIVER ADAPTER

FIELD

The present teachings relate to a receiver adapter that adapts a hitch post to fit within different sized receivers, and more specifically, a hitch step that is adjustable to accommodate different sized and shaped hitch receives so that when a hitch post of the hitch step is inserted into the receiver the hitch post can be adjusted to lock within the hitch receiver.

BACKGROUND

Attempts have been made to use a hitch and hitch receiver to create a hitch step. The hitch steps typically only fit one specific receiver. If the step is moved to a different receiver, one or more adapters or other items may be needed in order to form a stable fit. Other items, such as a second sleeve, have also been used to adapt the hitch post of the hitch step to a different receiver. As a result, the assembly becomes more complex and users often have difficulties determining the proper adapter, secondary sleeve, or both to properly secure the step to a receiver.

Examples of hitch step assemblies can be found in U.S. Pat. Nos. 6,170,843; 6,769,704; 8,727,364; 9,085,264; and 10,202,011; and U.S. Patent Publication No. 2001/0045720, all of which are incorporated herein for all purposes. It would be attractive to have a hitch post that is adaptable to fit different sized receivers. What is needed is an integral component that will adjust a post to lock a step into a receiver. What is needed is an adjustment mechanism to adjust a post of a hitch step. It would be attractive to have a hitch step that is stable regardless of a size of a receiver.

SUMMARY

The present teachings provide a receiver adapter comprising: a hitch post including: (i) a stable post and (ii) a bias post that is movable relative to the stable post between a removable position and a locked position.

The present teachings meet one or more of the present needs by providing: a hitch step comprising: (a) a step; and (b) a hitch post connected to and extending from the step, the hitch post including: (i) a stable post and (ii) a bias post that is movable relative to the stable post between a removable position and a locked position.

The present teachings meet one or more of the present needs by providing a receiver adapter, wherein: the stable post includes a post wedge; the bias post includes a bias post wedge; the stable post includes a post wedge and the bias post includes a bias post wedge and the post wedge and the bias post wedge are in contact with each other; the bias post moves along the stable post to increase a cross-sectional thickness of the stable post; a bias member extends between the stable post and the bias post and moves the bias post relative to the stable post; a fastener is fixedly connected to the bias post; an adjuster moves the bias post relative to the stable post; a bias member extends from the stable post to the bias post and, upon movement of an adjuster, the bias post moves relative to the stable post to increase a height or a cross-sectional thickness of the hitch post; the stable post includes a post wedge and the bias post includes a bias post wedge, and when the adjuster is moved the bias post is moved to align the post wedge so that the bias post moves up or down the post wedge; an angle of the post wedge and angle of the bias post wedge are complimentary so that the post wedge abuts the bias post wedge in a substantially flush manner; the adjuster adjusts a length of the bias member within the stable post, the bias post, or both to move the bias post; an outer surface of the stable post and an outer surface of the bias post are substantially coplanar in the removable position; the adapter is located at least partially within the stable post; the stable post remains stationary while the bias post moves relative to the stable post; or a combination thereof.

The present teachings meet one or more of the present needs by providing: a receiver adapter comprising: a hitch post having a stationary stable post and a bias post that is movable relative to the stable post between a removable position and a locked position, wherein: a bias member secures the bias post to the stable post and a length of the bias member within the stable post, the bias post, or both is adjusted to move the bias post relative to the stable post; an outer surface of the stable post and an outer surface of the bias post are substantially coplanar in the removable position and are located along substantially parallel planes in the locked position; the length of the bias member is adjusted by moving the bias member axially within a fastener secured to the bias post; the bias member is moved by an adjuster of the bias member located within the stable post; or a combination thereof.

The present teachings provide a hitch post that is adaptable to fit different sized receivers. The present teachings provide an integral component that will adjust a post to lock a step into a receiver. The present teachings provide an adjustment mechanism to adjust a post of a hitch step. The present teachings provide a hitch step that is stable regardless of a size of a receiver.

BRIEF DESCRIPTION OF THE DRAWINGS

FIG. 3 is top view of a hitch step;
FIG. 4A is a front view of a hitch post located in a receiver in a removable position;
FIG. 4B is a front view of the hitch post of FIG. 4A located in a receiver in a locked position;
FIG. 5 is a side view of a hitch post in a removable position;
and
FIG. 6 is a side view of the hitch post of FIG. 5 in a locked position.

DETAILED DESCRIPTION

Figure 1:
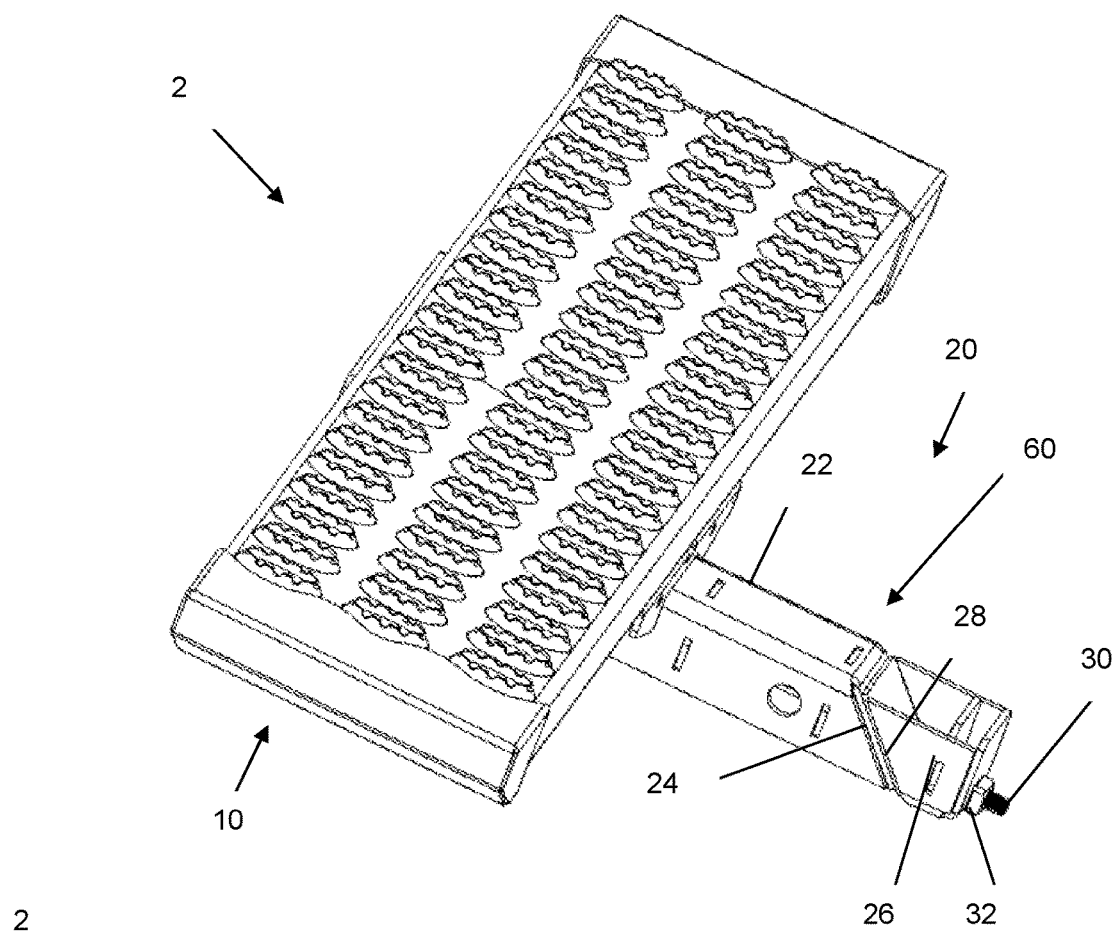
FIG. 1 is a top perspective view of a hitch step.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a receiver adapter. The receiver adapter may function to adapt a hitch post to fit within, and form a secure connection with, different sized receivers. The receiver adapter may function to support a platform. The platform may be a step, bicycle support, carrier, motorcycle carrier, supply carrier, wheelchair carrier, a ramp, any other device that extends from the receiver but does not pull a trailer behind the vehicle, or a combination thereof. The receiver adapter may be adapted to fit within receivers with different cross-sectional thicknesses, different sizes, different shapes, or a combination thereof. For example, the receiver adapter may fit within a receiver that is 1¼"×1¼" and then may be adapted to fit within a receiver that is 2"×2". The receiver adapter may be part of a hitch post. The hitch post and the receiver adapter may be connected to any of the devices herein. Preferably, the hitch post is connected to a hitch step.

A hitch step may function to assist a user in entering, exiting, loading, unloading, or a combination thereof a vehicle. A hitch step may be insertable into a receiver of a vehicle so that a user can use the hitch step to get into or out of a part of the vehicle. The hitch step may extend cantilever from a receiver of a vehicle. The hitch step may support a weight of about 50 kg or more, about 75 kg or more, about 100 kg or more, or about 125 kg or more. The hitch step may support a weight of about 300 kg or less, or about 225 kg or less, or about 175 kg or less. The hitch step may be sufficiently strong so that the hitch step does not rotate, bend, decouple with the receiver, or a combination thereof when a mass is added to the hitch step. The hitch step may include a step and a hitch post.

The step may function to create an intermediary location for a user to step upon to enter and/or exit a vehicle from a rear end. The step may be sufficiently large to fit one foot or two feet. The step may include grip (e.g., a frictional surface) so that the step is a rough surface, a foot does not slip, items cannot slide off the step, or a combination thereof. The step may include one or more holes. The step may be made of metal. The step may be square, rectangular, oval, diamond, or a combination thereof. The step may be any desired shape. The step may be connected to a hitch post.

The hitch post may function to create a connection with a receiver of a vehicle. The hitch post may extend cantilever from the receiver, the vehicle, or both. The hitch post may include a portion that extends into a receiver and a portion that extends from the receiver. The hitch post may be hollow, solid, a "U" shaped channel, a "C" shaped channel, a square, a rectangle, complementary in shape to the receiver, or a combination thereof. The hitch post may be connected to the receiver. The hitch post may be connected to the receiver by a pin, fastener, or both. The hitch post may include one or more apertures that align with one or more apertures of the receiver so that the receiver and the hitch post may be fixedly connected. The hitch post may be connected to the receiver so that the hitch post cannot be axially removed from the receiver. The hitch post may include a stable post and a bias post.

The stable post may function to create an immovable connection with a receiver and the step to support a mass that is on the hitch step. The stable post may support the step. The stable post may be fixedly connected to a component to be supported by the hitch post. The stable post may be connected to a platform. The stable post may include a portion that extends into the receiver. The stable post may be a solid piece that supports a platform. The stable post may deflect but may prevent rotation of a platform. The stable post may support the platform cantilever from a receiver. The stable post may include a post wedge.

The post wedge may function to create a surface for the bias post to slide along. The post wedge may assist in reorienting the bias post into contact with a wall of a receiver. The post wedge may extend at an angle. The post wedge and a portion of the bias post may extend at the same angle. The wedge post and the bias post may extend at complementary angles. The wedge post, the bias post, or both may extend at an angle of about 15 degrees or more, about 30 degrees or more, or about 40 degrees or more. The wedge post, the bias post, or both may extend at an angle of about 90 degrees or less, about 75 degrees or less, about 60 degrees or less, or about 50 degrees or less (e.g., about 45 degrees). The post wedge and bias post may extend at different angles. The bias post may move along the post wedge to form a connection with a receiver. The post wedge may be in contact with a bias post wedge of the bias post.

The bias post wedge may function to move along a post wedge when an adjuster is moved, a fastener is biased, or both. The bias post wedge may be axially movable or longitudinally movable (e.g., may move in a direction towards or away from the vehicle). The bias post wedge may move vertically, horizontally, some other direction at an angle relative to an axis of a bias member, a longitudinal axis, a rotational axis of a bias member, or a combination thereof. The bias post wedge may be cut apart from a stable post. The bias post wedge may have a sliding surface, a friction surface, or both. The bias post wedge and the post wedge may be smooth, jagged, have complementary surfaces, include one or more coatings, or a combination thereof. The bias post wedge may be solid. The bias post wedge may be hollow. The bias post wedge may be "C" shaped or "U" shaped. The bias post wedge may move the bias post as the bias member axially moves the bias post towards or away from the stable post. The bias post wedge and the post wedge may be made of the same material. The bias post wedge may be complementary in shape to the post wedge. The bias post wedge may form one end of the bias post.

The bias post may function to expand a cross section of a hitch post, contact a receiver, or both. The bias post may axially move, vertically move, or both. The bias post may be a movable member of the hitch post that is movable by a bias member. For example, the bias post may move relative to a stationary stable post based on biasing of the bias member. The bias post may be an extension of the stable post. The bias post and the stable post may connect to form a receiver adapter. The bias post may extend fully into the receiver or partially into the receiver. The bias post may prevent the platform from being axially removed, rotated, tipped, or a combination thereof. The bias post may only be connected to the stable post via one or more fasteners. The bias post may include one or more fasteners.

The one or more fasteners may function to assist in adjusting the bias post. The one or more fasteners may be integrally connected to the bias post. The one or more fasteners may connect the bias post to the stable post. The one or more fasteners may be threaded. The one or more fasteners may rotate about a rotational axis. Preferably, the one or more fasteners is fixed in place. The bias post may extend through one or more fasteners. The one or more fasteners may extend through the bias post, the stable post, or both. The one or more fasteners may be static, and the bias member may move relative to the fastener to bias the bias post, move the bias post relative to the stable post or both, or vice versa. The one or more fasteners may be connected to the bias post and may move with the bias post as the bias post is moved. The one or more fasteners may be connected to one end of a bias member and a second end of the bias member may be connected to an adjuster.

The bias member may function to bias the bias post relative to the stable post. The bias member may axially move, vertically move, or both the bias post. The bias member may be a threaded member, a bolt, or both. The bias member may axially move the bias post and the axial movement of the bias post may move the bias post and the fastener into or out of a plane. The bias member may extend through the stable post, the bias post, or both. The bias member may extend through a hollow region of the bias post, the stable post, or both. The bias member may have an adjuster on one end.

The adjuster may function to move the bias member so that the bias member biases the bias post. The adjuster may rotate. The adjuster may be axially static. The adjuster may be connected to the stable post. The adjuster may be sandwiched into contact with the stable post by the bias member being connected to a fastener. The adjuster may be a head of a bolt. The adjuster may be a lever, a handle, a rotation mechanism, a motor, a gear, a gear box, or a combination thereof. The adjuster may rotate about a rotational axis. The adjuster, when moved, may cause axial movement of the bias member, the bias post, or both. The adjuster may be partially or fully positioned within the stable post, the bias post, or both. The adjuster may rotate to move between a removable position and a locked position.

The removable position may be where the bias post and the receiver are free of contact or where the bias post is removable from the receiver. The removable position may have a gap between the bias post and the receiver. The removable position may have the receiver and the bias post in contact but the load may be sufficiently small so that the hitch post may be removed.

The locked position may be where the bias post and the receiver are in contact. The locked position may prevent the hitch post from being removed. The locked position may have the bias post moved axially, laterally, diagonally, or a combination thereof relative to the stable post. For example, in the removable position the stable post and the bias post may be substantially coplanar, but when the bias post is moved into the locked position, the stable post and the bias post may no longer be substantially coplanar.

FIG. 1 illustrates a top perspective view of a hitch step 2. The hitch step 2 includes a step 10 connected to a hitch post 20. The hitch post 20 includes a receiver adapter 60 having a stable post 22 with a post wedge 24. The post wedge 24 abuts a bias post wedge 28 of a bias post 26. A bias member 30 extends through the post wedge 24 and the bias post 26 so that a fastener 32 secures the bis member 30 the bias post 26.

Figure 2:
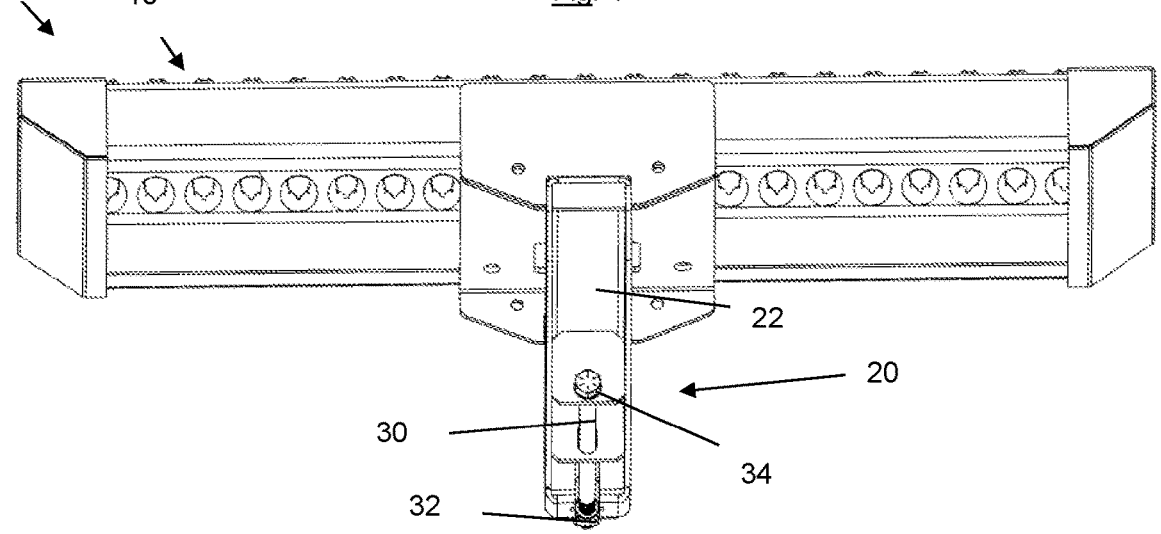
FIG. 2 is a bottom perspective view of a hitch step.

FIG. 2 illustrates a bottom perspective view of a hitch step 2. The hitch step 2 includes a step 10 connected to a hitch post 20. A bias member 30 extends through the hitch post 20 and is secured to the hitch post 20 via a fastener 32 (see FIG. 1). The bias member 30 is further connected to an adjuster 34 that may be configured to adjust a length of the bias member 30 within hitch post 20, outside of the hitch post 20, or both (see FIGS. 5 and 6). Additionally, a stable post 22 of the hitch post 20 may include an open bottom surface as shown, thereby forming a channel within the stable post 22.

FIG. 3 illustrates a top view of the hitch step 2 connected to a hitch post 20. The hitch post 20 includes a receiver adapter 60 having a stable post 22 and bias post 26. As illustrated, a bias member 30 extending through the stable post 22 and bias post 26 so that a fastener 32 secures the bias member 30 to the bias post 26.

FIG. 4A illustrates a front view of a bias post 26 of a hitch post 20 located within a receiver 40 (see FIG. 1). The bias post 26 is in a removable position 50 so that a gap (G) is located between the receiver 40 and hitch post 26 to allow insertion of the bias post 26 into the receiver 40, removal of the hitch post 26 from the receiver 40, or both.

FIG. 4B illustrates a front view of the bias post 26 of FIG. 4A within the receiver 40. As illustrated, the bias post 26 is in a locked position 52 and the gap (G) is removed so that the hitch post 26 and the receiver 40 are now in contact.

FIGS. 5 and 6 illustrate side views of a hitch post 20 in a removable position 50 and a locked position 52, respectively. The hitch post 20 is connected to a step 10 of a hitch step 2. In the removable position 50, a stable post 22 and a bias post 26 are aligned within a plane (P1) so that the stable post 22 and the bias post 26 are substantially coplanar in the removable position. As shown, a post wedge 24 of the stable post 22 is aligned and in contact with a bias post wedge 28 of the bias post 26. The post wedge 24 extends at an angle ($\alpha$) relative to a vertical line ($V_1$). The bias post wedge 28 extends at an angle ($\beta$) relative to a second vertical line ($V_2$). As illustrated, the angle ($\alpha$) of the post wedge 24 is complimentary to the angle ($\beta$) of the bias post wedge 28 so that the post wedge 24 and the bias post wedge 28 abut one another in a substantially flush manner.

As shown in FIG. 6, the hitch post 20 is in a locked position 52 where a bias member 30 moves the bias post 26 a distance (M) relative to the plane ($P_1$). As an adjuster 34 located substantially within the stable post 22 moves the bias member 30, the bias member 30 moves axially through a fastener 32, thereby increasing or decreasing a length of the bias member 30 located on a hitch step 2 side of the fastener 32. As illustrated, the distance (M) is shortened so that the bias post wedge 28 of the bias post 26 moves up the post wedge 24 of the stable post 22 so that the distance (M) is created and the hitch post 20 is locked in a receiver (not shown). It should be noted that the distance (M) may be adjusted by the adjuster 34 by threading a portion of the bias member 30 within the fastener 32. As the distance (M) is established, one or more extensions 36 attached or formed with the bias post 26 may be configured to extend above an upper surface of the bias post 26 and/or an upper surface of the stable post 22, thereby allowing for contact between an inner surface of a hitch receiver (not shown) and the one or more extensions 36.

ELEMENT LIST

2 Hitch Step
10 Step
20 Hitch Post
22 Stable Post
24 Post Wedge
26 Bias Post
28 Bias Post wedge
30 Bias Member
32 Fastener
34 Adjuster
36 Extension
40 Receiver
50 Removable Position
52 Locked Position
60 Receiver Adapter
G Gap (between the Receiver and the Hitch Post)
$P_1$ Plane V₁, V₂ Vertical Lines
α Angle (of the Post Wedge)
β Angle (of the Bias Post Wedge)
M Distance (of movement of the Hitch Post)

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A receiver adapter comprising:
   a. a hitch post including:
      i. a stable post that is a substantially hollow square tube and includes a post wedge, wherein the post wedge is a closed face of the stable post, and a bottom surface of the stable post is open; and
      ii. a bias post having a bias post wedge that extends at least partially over the post wedge and at least partially rests upon the post wedge so that the bias post is movable relative to the stable post along the post wedge between a removable position and a locked position, wherein the stable post remains stationary relative to a hitch receiver during installation of the hitch post into the hitch receiver while the bias post is moved between the removable position and the locked position; and
   wherein, to reach the locked position, the bias post moves along the post wedge to engage an upper surface of the hitch receiver and increase a cross-sectional thickness of the hitch post.

2. The receiver adapter of claim 1, wherein the post wedge and the bias post wedge are in contact with each other.

3. The receiver adapter of claim 1, wherein a bias member extends between the stable post and the bias post and moves the bias post relative to the stable post.

4. The receiver adapter of claim 1, wherein a fastener is fixedly connected to the bias post.

5. The receiver adapter of claim 1, wherein an adjuster moves the bias post relative to the stable post.

6. The receiver adapter of claim 1, wherein a bias member extends from the stable post to the bias post and, upon movement of an adjuster, the bias post moves relative to the stable post to increase a height or a cross-sectional thickness of the hitch post.

7. The receiver adapter of claim 6, wherein when the adjuster is moved the bias post is moved to align the post wedge so that the bias post moves up or down the post wedge.

8. The receiver adapter of claim 6, wherein an angle of the post wedge and angle of the bias post wedge are complimentary so that the post wedge abuts the bias post wedge in a substantially flush manner.

9. The receiver adapter of claim 6, wherein the adjuster adjusts a length of the bias member within the stable post, the bias post, or both to move the bias post.

10. The receiver adapter of claim 1, wherein an outer surface of the stable post and an outer surface of the bias post are substantially coplanar along a plane when in the removable position.

11. The receiver adapter of claim 5, wherein the adjuster is located at least partially within the stable post.

12. A hitch step comprising: a step and the receiver adapter of claim 1 connected to the step.

13. The receive adapter of claim 10, wherein a bias member extends through an entire length of both the stable post and the bias post and moves the bias post perpendicular to the plane relative to the stable post, and the bias member moves with the bias post perpendicular to the plane.

14. The receiver adapter of claim 1, wherein the bias post wedge is a closed face of the bias post.

15. The receiver adapter of claim 14, wherein the stable post includes a pinhole located along a face of the stable post that extends substantially parallel to a longitudinal axis of the stable post; and wherein a bias member extends from the stable post to the bias post and is positioned beneath the pinhole so as to be free of obstruction of the pinhole.

16. A receiver adapter comprising:
a. a hitch post including:
   i. a stable post having an upper surface, a lower surface, and a post wedge extending therebetween; and
   ii. a bias post having an upper surface, a lower surface, and a bias post wedge substantially parallel to the post wedge, the bias post wedge extending at least partially over the post wedge and at least partially rests upon the post wedge so that the bias post is movable relative to the stable post along the post wedge between a removable position and a locked position, wherein the stable post remains stationary relative to a hitch receiver during installation of the hitch post into the hitch receiver while the bias post is moved between the removable position and the locked position; and
wherein, to reach the locked position, the bias post moves along the post wedge to engage an upper surface of the hitch receiver and increase a cross-sectional thickness of the hitch post; and
wherein an extension is attached to the bias post that extends above the upper surface of the bias post and the upper surface of the stable post to contact an inner surface of the hitch receiver.

17. The receiver adapter of claim 16, wherein the upper surface of the stable post and the upper surface of the bias post are substantially coplanar in the removable position and are located along substantially parallel planes in the locked position.

18. The receiver adapter of claim 16, wherein the receiver adapter includes a bias member extending through a length of both the stable post and the bias post, and a length of the bias member is adjusted by moving the bias member axially within a fastener secured to the bias post.

19. The receiver adapter of claim 18, wherein the bias member is moved by an adjuster of the bias member located within the stable post.

\* \* \* \* \*